United States Patent

Finkenzeller et al.

Patent Number: 5,725,796
Date of Patent: *Mar. 10, 1998

[54] LIQUID-CRYSTAL DISPLAY

[75] Inventors: Ulrich Finkenzeller, Plankstadt; Herbert Plach, Darmstadt; Eike Poetsch, Mühltal; Volker Reiffenrath, Rossdorf, all of Germany

[73] Assignee: Merck Patent Gesellschaft met beschrankter Haftung, Darmstadt, Germany

[*] Notice: The term of this patent shall not extend beyond the expiration date of Pat. No. 5,286,411.

[21] Appl. No.: 461,737

[22] Filed: Jun. 5, 1995

Related U.S. Application Data

[62] Division of Ser. No. 847,715, Mar. 6, 1992, abandoned.

[30] Foreign Application Priority Data

Mar. 6, 1991 [DE] Germany .......... 41 07 167.0

[51] Int. Cl.$^6$ .......... C09K 19/52; G02F 1/13
[52] U.S. Cl. .......... 252/299.01; 252/299.61; 252/299.63; 252/299.66; 349/180; 349/182
[58] Field of Search .......... 252/299.63, 299.66, 252/299.01, 299.61; 349/180, 182

[56] References Cited

U.S. PATENT DOCUMENTS

| | | | |
|---|---|---|---|
| 4,684,476 | 8/1987 | Kitano et al. | 252/299.61 |
| 4,695,398 | 9/1987 | Goto et al. | 252/299.5 |
| 5,032,313 | 7/1991 | Goto et al. | 252/299.63 |
| 5,122,295 | 6/1992 | Weber et al. | 252/299.01 |
| 5,171,469 | 12/1992 | Hittich et al. | 252/299.01 |
| 5,178,790 | 1/1993 | Weber et al. | 252/299.01 |
| 5,188,758 | 2/1993 | Baur et al. | 252/299.01 |
| 5,194,178 | 3/1993 | Coates | 252/299.63 |
| 5,200,110 | 4/1993 | Obikawa et al. | 252/299.61 |
| 5,213,710 | 5/1993 | Reiffenrath et al. | 252/299.63 |
| 5,250,220 | 10/1993 | Wachtler et al. | 252/299.61 |
| 5,286,411 | 2/1994 | Rieger et al. | 252/299.63 |
| 5,350,535 | 9/1994 | Rieger et al. | 252/299.63 |
| 5,389,289 | 2/1995 | Rieger et al. | 252/299.01 |
| 5,389,292 | 2/1995 | Dorsch et al. | 252/299.61 |
| 5,456,860 | 10/1995 | Poetsch et al. | 252/299.63 |
| 5,458,805 | 10/1995 | Wachtler et al. | 252/299.63 |

FOREIGN PATENT DOCUMENTS

| | | |
|---|---|---|
| 0 414 048 | 2/1991 | European Pat. Off. |
| 37 32 284 | 4/1989 | Germany . |
| 39 39 983 | 7/1990 | Germany . |
| 39 34 328 | 4/1991 | Germany . |
| 89/08691 | 9/1989 | WIPO . |
| 89/08692 | 9/1989 | WIPO . |
| 91/00898 | 1/1990 | WIPO . |
| 90/01056 | 2/1990 | WIPO . |

*Primary Examiner*—Shean C. Wu
*Attorney, Agent, or Firm*—Millen, White, Zelano, & Branigan, P.C.

[57] ABSTRACT

The invention relates to a liquid-crystal display based on a twisted nematic cell and having
- two substrates provided with electrode layers and alignment layers thereon and, with a frame, forming a cell,
- a nematic liquid-crystal mixture having positive dielectric anisotropy present in the cell, and
- a twist angle of the liquid-crystal layer in the cell with a value of between 0° and 600° from alignment layer to alignment layer, whose liquid-crystal mixture is based on medium-polarity compounds of the SFM type which are selected so that the liquid-crystal mixture has a viscosity at 20° C. of less than 30 mm$^2$ s$^{-1}$ and has a value of $$\overline{K}/\Delta\epsilon \leq 1.5$$

for the quotient of the Frank constant $\overline{K}$ $$\overline{K} = K_{11} + \left(\frac{v}{\pi}\right)^2 \left[ K_{33} - 2K_{22}\left(1 - \frac{2\pi d}{p \cdot v}\right) \right]$$

and the dielectric anisotropy $\Delta\epsilon$ $$\Delta\epsilon = \epsilon_{\parallel} - \epsilon_{\perp}$$

when used in a TN cell ($v=\pi/2$, $d/p \ll 1$)

$$\overline{K}/\Delta\epsilon \leq 1.5$$

where $v$ is the twist angle in rad, $d$ is the layer thickness in µm, $p$ is the pitch length in µm and $K_{11}$, $K_{22}$ and $K_{33}$ are the elastic constants for splay, twist and bend in $10^{-12}$N.

50 Claims, No Drawings

LIQUID-CRYSTAL DISPLAY

This is a division of application Ser. No. 07/847,715 filed Mar. 6, 1992 now abandoned.

SUMMARY OF THE INVENTION

The invention relates to a liquid-crystal display based on a twisted nematic cell and having

- two substrates provided with electrode layers and alignment layers thereon and, with a frame, forming a cell,
- a nematic liquid-crystal mixture having positive dielectric anisotropy present in the cell, and
- a twist angle of the liquid-crystal layer in the cell with a value of between 0° and 600° from alignment layer to alignment layer.

The term twisted nematic cell is broadly drawn here and includes cells having a dielectrically positive, twisted nematic liquid-crystal layer having a twist angle of $0<v\leq 600°$. Liquid-crystal cells having twist angles v of between about 80° and 100° are usually known as TN (twisted nematic) cells; the structure of such cells is described, for example, in Thermotropic Liquid Crystals, G. W. Gray, [ed.], pp. 77 ff. Liquid-crystal cells having twist angles $v>100°$ are generally called STN (super-twisted nematic) cells, while the term LTN (low-twisted nematic) cell has been proposed in P 40 10 503 for cells where $v<80°$. A short description of STN displays is given, for example, in B.S. Scheuble, Liquid Crystal Displays with High Information Content, Kontakte 1/89, pp. 34–38, Darmstadt.

The nematic liquid-crystal mixture is positioned between 2 substrates provided with electrode layers and alignment layers thereon and, with a frame, forming a cell. The term nematic is broadly drawn here and also includes nematic-cholesteric liquid-crystal mixtures.

The liquid-crystal displays according to the invention can be addressed statically. In this case, one of the two electrode layers is usually segmented, each segment being provided with a separate supply line, while the other electrode is generally in the form of a large-area counterelectrode.

Due to the large number of supply lines necessary, static addressing is generally less preferred, and multiplex addressing has generally become established, in particular in the case of displays having a relatively high or high information content. In the case of passive multiplex addressing, a matrix comprising p×q pixels is defined by p segment leads on one electrode and q back-plane leads on the other electrode. This matrix is addressed by applying generally complex voltage programs to segment and backplane leads, as described, for example, in E. Kaneko, Liquid Crystal Displays, KTK Scientific Publishers, Tokyo, 1978, chapter 4.

By contrast, if an active matrix is used the individual pixel is switched by nonlinear addressing elements integrated into the pixel. The nonlinear elements used to produce the active matrix may have 2 or 3 connections. The elements having 2 connections are, for example, varistors or diodes (for example MIM=metal-insulator-metal, MSI=metal/silicon nitride/indium-tin oxide), while the nonlinear elements having 3 connections are generally thin-film transistors (TFTs), of which several types are discussed, differing through the semiconductor material used.

When nonlinear elements having 3 connections are used, only one connection is generally necessary for the counterelectrode, while the counterelectrode is usually also scanned in the case of active matrix addressing based on elements having 2 connections.

Further details on the addressing of liquid-crystal displays by an active matrix of nonlinear elements is given, for example, in A. H. Firester, SID, 1987, Society for Information Display Seminar 5: Active Matrices for Liquid Crystals, further in E. Kaneko, Liquid Crystals Displays, KTK Scientific Publishers, Tokyo, Japan, 1987, chapters 6 and 7 or P.M. Knoll, Displays, Heidelberg, 1986, pp. 216 ff.

The liquid crystals used in twisted nematic cells must, in addition to a broad mesogenic range, a high clearing point and favorable values for the optical anisotropy, in particular also have high specific resistance and high UV and heat stability of the specific resistance. This is, in particular, of crucial importance for cells addressed by means of an active matrix, which is associated with the fact that each pixel, with respect to the active nonlinear element in each case, represents a capacitive load which is charged in the rhythm of the addressing cycle. The blocking resistance of these elemental capacitors must be as high as possible so that the voltage applied to an addressed pixel only drops a little before the pixel is recharged in the next addressing cycle. A quantitative measure of the drop in voltage applied to a pixel is the so-called holding ratio (HR), which is defined as the ratio between the drop in voltage over a pixel in the unaddressed state and the applied voltage; a method for determining the HR is indicated, for example, in Rieger, B. et al., Conference Proceedings of the Freiburg Conference on Liquid Crystals, Freiburg 1990.

It has been shown that liquid-crystal compounds of the SFM type (superfluorinated liquid-crystal materials, see, for example, H. J. Plach et al., Eurodisplay 90) generally satisfy the requirement for high specific resistance and for high heat and UV stability of the specific resistance to a particular extent, while liquid-crystal compounds containing a terminal cyano group have significantly poorer heat and UV stability. SFM compounds contain a terminal group

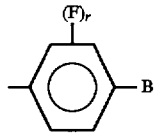

in which B is, for example, F, Cl, $OCF_3$, $OCHF_2$, $CF_3$, $C_2F_5$ or $OC_2F_5$, and the 1,4-phenylene ring may be monofluorinated or polyfluorinated (r=0–4).

Although liquid-crystal mixtures based on SFM compounds were originally developed for active matrix applications, the use of such materials has in the meantime also been discussed for passively multiplexed TN, LTN and STN systems due to their excellent stability.

However, it is disadvantageous that liquid-crystal compounds of the SFM type generally have only moderate polarity, resulting in relatively high threshold voltages. Since considerable simplification and reduction in costs for the driving electronics can frequently be achieved by reducing the threshold voltage, twisted nematic cells which have a low threshold voltage and high UV and heat stability are highly desirable from both technological and economical points of view.

A further important requirement of liquid-crystal mixtures used in twisted nematic cells is that they must have low viscosity values in order to achieve short response times.

An object of the present invention is to provide nematic liquid-crystal mixtures which are characterized, in particular, by advantageous viscosity values in addition to high stability, a large mesogenic range, a high clearing point and advantageous values for the optical anisotropy, and, when used in a twisted nematic cell, are characterized by advantageous values for the threshold voltage and the response times.

Upon further study of the specification and appended claims, further objects and advantages of this invention will become apparent to those skilled in the art.

It has been found that these objects can be achieved by the development of the mixture concept according to the invention and by the provision of the liquid-crystal displays and liquid-crystal mixtures according to the invention.

The invention thus relates to a liquid-crystal display based on a twisted nematic cell and having

- two substrates provided with electrode layers and alignment layers thereon and, with a frame, forming a cell,
- a nematic liquid-crystal mixture having positive dielectric anisotropy present in the cell, and
- a twist angle of the liquid-crystal layer in the cell with a value of between 0° and 600° from alignment layer to alignment layer, characterized in that the liquid-crystal mixture is based on medium-polarity compounds of the SFM type which are selected so that the nematic liquid-crystal mixture has a viscosity at 20° C. of less than 30 mm$^2$ s$^{-1}$ and has a value of $$\overline{K}/\Delta\epsilon \leq 1.5$$

for the quotient of the Frank constant $\overline{K}$ $$\overline{K} = K_{11} + \left(\frac{v}{\pi}\right)^2 \left[K_{33} - 2K_{22}\left(1 - \frac{2\pi d}{p \cdot v}\right)\right]$$

and the dielectric anisotropy $\Delta\epsilon$ $$\Delta\epsilon = \epsilon_\parallel - \epsilon_\perp$$

when used in a TN cell ($v=\pi/2$, $d/p<<1$)

$$\overline{K}/\Delta\epsilon \leq 1.5$$

where $v$ is the twist angle in rad, d is the layer thickness in μm, p is the pitch length in μm and $K_{11}$, $K_{22}$ and $K_{33}$ are the elastic constants for splay, twist and bend in $10^{-12}$N.

Preferably, the liquid-crystal mixture which is based on SFM compounds contains at least 40%, particularly more than 50% SFM compounds. Preferred liquid-crystal mixtures contain more than 60%, especially more than 65% SFM compounds.

The solution of the objects is based on the knowledge that, in order to achieve a low threshold voltage, the liquid-crystal compounds must be selected so that the elastic constants and the dielectric anisotropy of the liquid-crystal mixture are optimized.

A parameter which takes into account both the elastic properties and the dielectric properties of the medium is the quotient $\overline{K}/\Delta\epsilon$ formed from the Frank constant $\overline{K}$ and the dielectric anisotropy $\Delta\epsilon$ of the medium. The elastic constants $K_{11}$, $K_{22}$ and $K_{33}$ are preferably measured by the method described in A. Beyer, U. Finkenzeller, Physical Properties of Liquid Crystals, VI: Elastic Constants, The Merck Group Liquid Crystal Newsletter No. 7, February 91, Darmstadt.

It has been found that SFM compounds which contain a terminal group of the formula (G1)

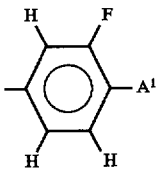

(G1)

in which $A^1$ is $-OCHF_2$ or $-CHF_2$, frequently have relatively high values for the elastic constants, in particular for $K_{11}$ and $K_{33}$. Thus, for example, the following elastic constants have been measured (at $T_{red}=0.715$; $T_{red}=T/T_{clp}$.) for $H_7C_3$-CYc-CYc-Phe-$OCHF_2$. F:

$K_{11}=20.9.10^{-12}$N $K_{22}=11.0.10^{-12}$N $K_{33}=33.7.10^{-12}$N

It is frequently not possible to adequately compensate these relatively high values for elastic constants through the values for $\Delta\epsilon$, which are frequently also relatively high, so that the proportion of compounds containing a terminal group (G1) in the liquid-crystal mixtures according to the invention is preferably not too high and in particular is less than 5%. The dielectric anisotropy for the above-mentioned compound is $\Delta\epsilon=8.1$.

By contrast, SFM compounds containing a terminal group (G2)

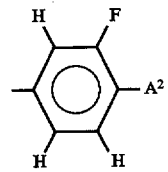

(G2)

in which $A^2$ is Cl, F, $CF_3$ or $OCF_3$, in particular Cl or F, are frequently characterized by favorable values for the elastic constants.

A homolog mixture comprising 60.0% of $H_5C_2$-Cyc-Cyc-Phe.3F-F
20.0% of $H_7C_3$-Cyc-Cyc-Phe.3F-F
20.0% of $H_9C_4$-Cyc-Cyc-Phe.3F-F has, for example, the following physical parameters:

| | | | |
|---|---|---|---|
| $\Delta\epsilon$ | = | 3.6 | |
| $K_{11}$ | = | $5.4 \cdot 10^{-12} N$ | |
| $K_{22}$ | = | $3.9 \cdot 10^{-12} N$ | ($T_{red}=0.950$) |
| $K_{33}$ | = | $8.6 \cdot 10^{-12} N$ | |

For a TN cell filled with this mixture ($v=\pi/2$, $d/p<<1$)

this gives a value of $\overline{K}/\Delta\epsilon=1.6$.

SFM compounds which contain a structural element of the formula (G2) frequent have relatively low values for $\Delta\epsilon$ in addition to the favorable values for the elastic constants. The proportion of such compounds in mixtures according to the invention is therefore preferably not too high and is in particular not greater than 65% and very particularly not greater than 50%. Thus, Use Example 2 of EP 0 387 032 describes a liquid-crystal mixture obtained by adding 15.0% of H₇C₃-Cyc-Cyc-Phe.3F5F-F to a base mixture comprising 33.3% of H₅C₂-Cyc-Cyc-Phe.3F-F
33.3% of H₇C₃-Cyc-Cyc-Phe.3F-F
33.3% of H₁₁C₅-Cyc-Cyc-Phe.3F-F.

The threshold voltage, measured in a TN cell, of the mixture obtained by adding H₇C₃-Cyc-Cyc-Phe.3F5F-F to the base mixture is 2.32 V. This high value for the threshold voltage is attributable to the fact that the proportion by weight of compounds containing the structural elements (G2) in this mixture is 85% and is thus too high.

Particularly preferred constituents of liquid-crystal mixtures according to the invention are SFM compounds which contain a terminal group (G3)

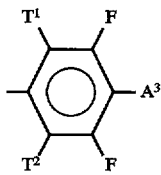

(G3)

in which $T^1$ and $T^2$, independently of one another, are H or F, and $A^3$ is F, Cl, $CF_3$, $OCF_3$, $C_2F_5$ or $OC_2F_5$.

Particular preference is given to liquid-crystal mixtures containing one or more compounds which contain a polar group of the formula (G3) where $A^3$=F. Thus, the following homolog mixture, comprising 33.7% of H₇C₃-Cyc-Phe-Phe.3F5F-F
66.3% of H₁₁C₅-Cyc-Phe-Phe.3F5F-F has the following physical parameters:

$\Delta\epsilon = 7.4$ $K_{11} = 4.1 \cdot 10^{-12} N$ $K_{22} = 2.6 \cdot 10^{-12} N$  $(T_{red}=0.950)$ $K_{33} = 4.9 \cdot 10^{-12} N$ $\dfrac{\overline{K}}{\Delta\epsilon} = 0.54$ Melting point $T_m = -7°$ C.

If 3,4,5-trifluorophenyl compounds are used, a particularly high proportion by weight of these compounds in the liquid-crystal mixtures according to the invention of greater than 15%, in particular greater than 20%, is preferred, and liquid-crystal mixtures which contain more than 25% by weight of 3,4,5-trifluorophenyl compounds are particularly preferred. Liquid-crystal mixtures which contain at least one bicyclic and one tricyclic 3,4,5-trifluorobenzene derivative are distinguished by favorable dielectric and elastic constants and by advantageous viscosity values.

The proportion by weight of 3,4,5-trifluorobenzene derivatives in the liquid-crystal mixture may frequently also be greater than 30%, and in some cases liquid-crystal mixtures which comprise more than 50% or even more than 60% of 3,4,5-trifluorobenzene derivatives are particularly preferred.

If 3,5-difluoro-4-chlorobenzene derivatives and 3,5-difluoro-4-trifluoromethoxybenzene derivatives are used, the proportion by weight of these compounds in the liquid-crystal mixtures according to the invention is generally less crucial, and a significant improvement in the properties of the starting mixture is frequently observed even when less than 15% of these compounds are added. However, liquid-crystal mixtures according to the invention which contain more than 15%, in particular more than 20%, very particularly more than 25%, of 3,5-difluoro-4-chlorobenzene derivatives and/or 3,5-difluoro-4-trifluoromethoxybenzene derivatives are very particularly preferred here too.

Mixtures containing very high proportions by weight of 3,5-difluoro-4-chlorobenzene derivatives of more than 40% are frequently particularly preferred. An example which may be mentioned is the following homolog mixture, comprising 41.0% of H₇C₃-Cyc-Phe-Phe.3F5F-Cl
66.3% of H₁₁C₅-Cyc-Phe-Phe.3F5F-Cl which has the following properties:

$\Delta\epsilon = 6.0$ $K_{11} = 3.8 \cdot 10^{-12} N$ $K_{22} = 3.8 \cdot 10^{-12} N$  $(T_{red}=0.950)$ $K_{33} = 7.4 \cdot 10^{-12} N$
Clearing point $T_c = 98.7°$ C.
$\overline{K}/\Delta\epsilon = 0.63$.

It has furthermore been found that 3,5-difluoro-4-trifluoromethoxy derivatives are characterized by particularly favorable values for the dielectric anisotropy and the viscosity, while these compounds frequently have somewhat less favorabe values for the elastic constants compared with 3,4,5-trifluorobenzene derivatives, 3,5-difluoro-5-chlorobenzene derivatives and 3,5-difluoro-4-trifluoromethyl derivatives. The proportion by weight of 3,5-difluoro-4-trifluoromethoxybenzene derivatives in the liquid-crystal mixture is preferably not too high and is in particular less than 30%, very particularly not greater than 20%. Particular preference is given to liquid-crystal mixtures containing between 5% and 15% of 3,5-difluoro-4-trifluoromethoxy compounds for improving the viscosity and between 5% and 45% of one or more compounds containing a structural element (G3) in which $A^3$ is F, Cl, $CF_3$, $C_2F_5$ or $OC_2F_5$ for optimizing the dielectric and elastic properties.

Particularly preferred constituents of the liquid-crystal mixtures according to the invention are furthermore SFM compounds which contain one of the following terminal groups

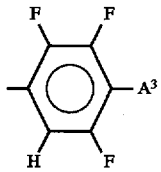

(G3-3)

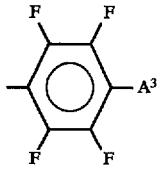

(G3-4)

where $A^3$ is as defined above.

Surprisingly, it has been found that the threshold voltage of the liquid-crystal displays according to the invention can frequently be significantly improved merely on addition of relatively small amounts of greater than 5% and in particular greater than 10% of one or more compounds containing one of the structural elements (G3-3) or (G3-4). However, the proportion by weight of these compounds in the liquid-crystal mixtures according to the invention is preferably greater than 12%, in particular greater than 15%, very particularly not less than 20%.

Particularly preferred constituents of the liquid-crystal mixtures according to the invention are furthermore SFM compounds which contain a non-terminal group of the formula (G4)

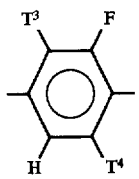

where at least one of the radicals $T^3$ and $T^4$ is F and the other radical is H or F.

Particular preference is given to the liquid-crystal mixtures which contain 5–50% of one or more compounds containing a structural element (G2) and simultaneously 5–65% of one or more compounds containing a structural element (G3).

Liquid-crystal mixtures which contain one or more compounds selected from the group comprising SFM compounds containing the structural features (G1)–(G4) and in particular (G2)–(G4) and which have a value for $\overline{K}/\Delta\epsilon$ which is less than 1.5 and in particular less than 1.3 are preferred. Particular preference is given to liquid-crystal mixtures where $\overline{K}/\Delta\epsilon$ is <1.2, in particular where $\overline{K}/\Delta\epsilon$ is <1.1, and very particularly where $\overline{K}/\Delta\epsilon$ is <1.0.

Very particular preference is furthermore given to liquid-crystal mixtures based on compounds of the formula I

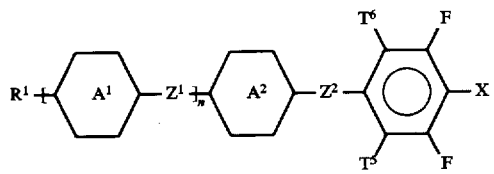

in which $R^1$ is an alkyl, alkoxy, oxaalkyl or alkenyl radical having 1–10 carbon atoms which is unsubstituted or at least monosubstituted by halogen, n is 0 or 1, $Z^1$ and $Z^2$, independently of one another, are —$CH_2CH_2$—, —COO—, —OCO— or a single bond, $T^5$ and $T^6$, independently of one another, are H or F,

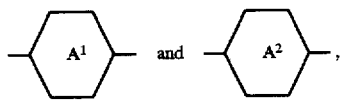

independently of one another, are trans-1,4-cyclohexylene, 1,4-phenylene, 2-fluoro-1,4-phenylene or 3-fluoro-1,4-phenylene, and one of

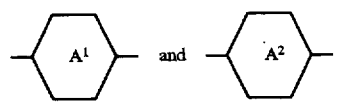

is alternatively pyridine-2,5-diyl, pyrimidine-2,5-diyl or trans-1,3-dioxane-2,5-diyl, and X is F, Cl, $OCF_3$ or $CF_3$, and which have a value for $\overline{K}/\Delta\epsilon$ of less than 1.3 and in particular less than 1.2.

The liquid-crystal mixture preferably contains more than 5%, particularly not less than 10%, of one or more compounds of formula I. Preferred are liquid-crystal mixtures containing not less than 15%, especially more than 17.5%, of one or more compounds of formula I.

For reasons of simplicity above and below, Phe is 1,4-phenylene, Phe.2F is 2-fluoro-1,4-phenylene, Phe.3F is 3-fluoro-1,4-phenylene, Cyc is trans-1,4-cyclohexylene, Dio is trans-1,5-dioxane-2,5-diyl, Pyr is pyrimidine-2,5-diyl and Pyd is pyridine-2,5-diyl, the two abbreviations Pyr and Pyd each covering the two possible positional isomers. Furthermore, Phe.(F) denotes a 1,4-phenylene group which is unsubstituted or 2- or 3-monofluorinated. Phe.3F is a 3-monofluorinated 1,4-phenylene group, and Phe.2F and Phe.5F have corresponding meanings; Phe.3F5F denotes a 3,5-difluorinated 1,4-phenylene group, while Phe.$F_2$ is a 2,3-difluorinated 1,4-phenylene group. Phe.2F3F5F is a 2,3,5-trifluorinated 1,4-phenylene group, and the meanings of Phe.2F3F6F and Phe.2F3F5F6F are corresponding.

Liquid-crystal mixtures containing one or more bicyclic compounds of the formulae I2-1–I2-9 are preferred:

| | |
|---|---|
| $R^1$—Cyc—Phe.3F5F—X | I2-1 |
| $R^1$—Cyc—$CH_2CH_2$—Phe.3F5F—X | I2-2 |
| $R^1$—Phe—Phe.3F5F—X | I2-3 |
| $R^1$—Phe.3F—Phe.3F5F—X | I2-4 |
| $R^1$—Phe.(F)—COO—Phe.3F5F—X | I2-5 |
| $R^1$—Pyr—Phe.3F5F—X | I2-6 |
| $R^1$—Pyd—Phe.3F5F—X | I2-7 |
| $R^1$—Dio—Phe.3F5F—X | I2-8 |
| $R^1$—Phe.(F)—$CH_2CH_2$—Phe.3F5F—X | I2-9 |

In the compounds of the formulae I2-1–I2-9, X is F, Cl, $OCF_3$ or $CF_3$, in particular Cl or $CF_3$. In the case where X=F, the proportion by weight of the compounds of the formulae I2-1–I2-9 in the liquid-crystal mixture is preferably at least 15%, in particular not less than 20%.

Preference is furthermore given to liquid-crystal mixtures which contain one or more tricyclic compounds of the formulae I3-1–I3-25:

| | |
|---|---|
| $R^1$—Cyc—Cyc—Phe.3F5F—X | I3-1 |
| $R^1$—Cyc—Cyc—$CH_2CH_2$—Phe.3F5F—X | I3-2 |
| $R^1$—Cyc—Cyc—COO—Phe.3F5F—X | I3-3 |
| $R^1$—Cyc—Phe—Phe.3F5F—X | I3-4 |
| $R^1$—Cyc—$CH_2CH_2$—Phe.(F)—Phe.3F5F—X | I3-5 |
| $R^1$—Cyc—COO—Phe.(F)—Phe.3F5F—X | I3-6 |
| $R^1$—Cyc—Phe.3F—Phe.3F5F—X | I3-7 |
| $R^1$—Cyc—Phe.2F—Phe.3F5F—X | I3-8 |
| $R^1$—Cyc—Phe.3F5F—Phe.3F5F—X | I3-9 |
| $R^1$—Phe.(F)—Phe.(F)—Phe.3F5F—X | I3-10 |
| $R^1$—Phe—$CH_2CH_2$—Phe.(F)—Phe.3F5F—X | I3-11 |
| $R^1$—Phe—COO—Phe.(F)—Phe.3F5F—X | I3-12 |
| $R^1$—Phe—Phe.(F)—$CH_2CH_2$—Phe.3F5F—X | I3-13 |
| $R^1$—Cyc—Phe—$CH_2CH_2$—Phe.3F5F—X | I3-14 |
| $R^1$—Cyc—Phe.3F—$CH_2CH_2$—Phe.3F5F—X | I3-15 |
| $R^1$—Cyc—Phe.3F5F—$CH_2CH^2$—Phe.3F5F—X | I3-16 |
| $R^1$—Cyc—Phe—COO—Phe.3F5F—X | I3-17 |
| $R^1$—Cyc—Phe.3F—COO—Phe.3F5F—X | I3-18 |
| $R^1$—Cyc—Phe.2F—COO—Phe.3F5F—X | I3-19 |
| $R^1$—Cyc—Phe.3F5F—COO—Phe.3F5F—X | I3-20 |
| $R^1$—Pyd—Phe.(F)—Phe.3F5F—X | I3-21 |
| $R^1$—Pyr—Phe.(F)—Phe.3F5F—X | I3-22 |
| $R^1$—Dio—Cyc—Phe.3F5F—X | I3-23 |
| $R^1$—Dio—Cyc—$CH_2CH_2$—Phe.3F5F—X | I3-24 |
| $R^1$—Dio—Cyc—COO—Phe.3F5F—X | I3-25 |

In compounds of the formulae I3-1–I3-25, $R^1$ is preferably n-alkyl or n-alkoxy having 1–10 carbon atoms, or alternatively n-alkoxymethyl or n-alkoxyethyl having 1–8 carbon atoms. Very particular preference is given to compounds of the formulae I3-1–I3-25 in which $R^1$ is methyl, ethyl, propyl, butyl, pentyl, hexyl, heptyl, octyl, nonyl, decyl, methoxy, ethoxy, propoxy, butoxy, pentoxy, hexoxy, heptoxy, octoxy, methoxymethyl, ethoxymethyl, propoxymethyl, butoxymethyl, methoxyethyl, ethoxyethyl or propoxyethyl. Compounds which, in addition to the terminal 3,5-difluoro-4-X-phenyl group, contain one trans-1,4-cyclohexylene group or a further fluorinated 1,4-phenylene group have particularly favorable elastic properties. In the compounds of the formulae I3-1–I3-25, X is F, Cl, $CF_3$ or $OCF_3$, and in particular F, Cl or $CF_3$. The proportion by weight of the compounds of the formulae I3-1–I3-25 in the liquid-crystal mixture according to the invention preferably being greater than 15%, in particular not less than 20%.

Preference is furthermore given to liquid-crystal mixtures which contain one or more tetracyclic compounds of the formulae I4-1–I4-9:

| | |
|---|---|
| $R^1$—Phe—Phe.(F)—Phe.(F)—Phe.3F5F—X | I4-1 |
| $R^1$—Cyc—Phe.(F)—Phe.(F)—Phe.3F5F—X | I4-2 |
| $R^1$—Dio—Phe.(F)—Phe.(F)—Phe.3F5F—X | I4-3 |
| $R^1$—Cyc—Cyc—Phe.(F)—Phe.3F5F—X | I4-4 |
| $R^1$—Cyc—Cyc—$CH_2CH_2$—Phe.(F)—Phe.3F5F—X | I4-5 |
| $R^1$—Cyc—Cyc—COO—Phe.(F)—Phe.3F5F—X | I4-6 |
| $R^1$—Cyc—Cyc—Cyc—Phe.3F5F—X | I4-7 |
| $R^1$—Cyc—Cyc—Cyc—$CH_2CH_2$—Phe.3F5F—X | I4-8 |
| $R^1$—Cyc—Cyc—Cyc—COO—Phe.3F5F—X | I4-9 |

Compounds of the formula I4 and in particular of the formulae I4-1–I4-9 have a high clearing point and favorable dielectric properties and, in spite of the relatively great molecular extension, are characterized by favorable values for the viscosity and the elastic properties. Compounds of the formula I4 and in particular of the formulae I4-1–I4-9 are therefore used for fine adjustment and optimization of certain properties, such as, for example, clearing points or values of the mesogenic range, of liquid-crystal mixtures which are based on bicyclic and/or tricyclic compounds of the formulae I2 and I3 without the dielectric and in particular the elastic properties of these mixtures being excessively impaired.

The proportion by weight of the compounds of the formula I4 and in particular of the formulae I4-1–I4-9 in the liquid-crystal mixtures according to the invention is preferably not too high, in particular is less than 20% and very particularly not more than 10%.

The compounds of Formula I, as well as compounds containing structural elements (G1)–(G4), are known per se; and processes for their preparation are indicated, for example, in German Applications P 39 29 525, corresponding to U.S. patent application Ser. No. 07/623,385, and P 40 24 760, corresponding to U.S. patent application Ser. No. 07/781,151. Compound classes or compounds not mentioned therein can be prepared by analogous processes or by further known methods, as described in the literature (see, for example, standard works such as Houben-Weyl, *Methoden der Organischen Chemie*, Georg-Thieme-Verlag, Stuttgart).

SFM compounds selected from the group of compounds containing at least one structural element of the formulae (G1)–(G4) and/or characterized by the formula I are highly suitable as a constituent of liquid-crystal mixtures having optimized values for the dielectric anisotropy, viscosity and elastic constants, it having been shown that the proportion by weight of these compounds in the liquid-crystal mixtures according to the invention must generally not be too low and is preferably greater than 10%, in particular greater than 15% and very particularly greater than 20%.

The properties of the liquid-crystal mixtures according to the invention can frequently be improved if the starting mixtures to which compounds are added, which compounds contain at least one structural element (G1)–(G4) and/or are characterized by the formula I, are designed carefully and already have relatively favorable values for the elastic constants, the dielectric anisotropy and the viscosity.

The starting mixture preferably contains dielectrically neutral or dielectrically positive, bicyclic compounds. Especially preferred is the relatively small group of bicyclic compounds of the formulae II-1–II-52 listed below:

| | |
|---|---|
| $R^2$—Cyc—Phe—$R^2$ | II-1 |
| $R^2$—Cyc—Phe.(F)—F | II-2 |
| $R^2$—Cyc—Phe.(F)—Cl | II-3 |
| $R^2$—Cyc—Phe.(F)—$CF_3$ | II-4 |
| $R^2$—Cyc—Phe.(F)—$OCF_3$ | II-5 |
| $R^2$—Cyc—Phe.(F)—$C_2F_5$ | II-6 |
| $R^2$—Cyc—$CH_2CH_2$—Phe.(F)—$R^2$ | II-7 |
| $R^2$—Cyc—$CH_2CH_2$—Phe.(F)—Cl | II-8 |
| $R^2$—Cyc—$CH_2CH_2$—Phe.(F)—F | II-9 |
| $R^2$—Cyc—$CH_2CH^2$—Phe.(F)—$CF_3$ | II-10 |
| $R^2$—Cyc—$CH_2CH^2$—Phe.(F)—$OCF_3$ | II-11 |
| $R^2$—Cyc—COO—Phe.(F)—$R^2$ | II-12 |
| $R^2$—Cyc—COO—Phe.(F)—Cl | II-13 |
| $R^2$—Cyc—COO—Phe.(F)—F | II-14 |
| $R^2$—Cyc—COO—Phe.(F)—$CF_3$ | II-15 |
| $R^2$—Cyc—COO—Phe.(F)—$OCF_3$ | II-16 |
| $R^2$—Phe.(F)—Phe.(F)—$R^2$ | II-17 |
| $R^2$—Phe.(F)—Phe.(F)—F | II-18 |
| $R^2$—Phe.(F)—Phe.(F)—Cl | II-19 |
| $R^2$—Phe.(F)—Phe.(F)—$CF_3$ | II-20 |
| $R^2$—Phe.(F)—Phe.(F)—$OCF_3$ | II-21 |
| $R^2$—Phe.(F)—COO—Phe.(F)—$R^2$ | II-22 |
| $R^2$—Phe.(F)—COO—Phe.(F)—F | II-23 |
| $R^2$—Phe.(F)—COO—Phe.(F)—Cl | II-24 |
| $R^2$—Phe.(F)—COO—Phe.(F)—$CF_3$ | II-25 |
| $R^2$—Phe.(F)—COO—Phe.(F)—$OCF_3$ | II-26 |
| $R^2$—Phe.(F)—$CH_2CH_2$—Phe.(F)—$R^2$ | II-27 |
| $R^2$—Phe.(F)—$CH_2CH_2$—Phe.(F)—F | II-28 |
| $R^2$—Phe.(F)—$CH_2CH_2$—Phe.(F)—Cl | II-29 |
| $R^2$—Phe.(F)—$CH_2CH_2$—Phe.(F)—$CF_3$ | II-30 |
| $R^2$—Phe.(F)—$CH_2CH_2$—Phe.(F)—$OCF_3$ | II-31 |
| $R^2$—Phe.(F)—$CH_2CH_2$—Phe.(F)—$OC_2F_5$ | II-32 |
| $R^2$—Dio—Cyc—$R^2$ | II-33 |
| $R^2$—Cyc—Cyc—$R^2$ | II-34 |
| $R^2$—Pyr—Phe.(F)—$R^2$ | II-35 |
| $R^2$—Pyr—Phe.(F)—F | II-36 |
| $R^2$—Pyr—Phe.(F)—Cl | II-37 |
| $R^2$—Pyr—Phe.(F)—$CF_3$ | II-38 |
| $R^2$—Pyr—Phe.(F)—$OCF_3$ | II-39 |
| $R^2$—Pyr—Phe.(F)—$OCHF_2$ | II-40 |
| $R^2$—Pyr—Phe.(F)—$C_2F_5$ | II-41 |
| $R^2$—Pyd—Phe.(F)—$R^2$ | II-42 |
| $R^2$—Pyd—Phe.(F)—F | II-43 |
| $R^2$—Pyd—Phe.(F)—Cl | II-44 |
| $R^2$—Pyd—Phe.(F)—$OCF_3$ | II-45 |
| $R^2$—Pyd—Phe.(F)—$OCHF_2$ | II-46 |
| $R^2$—Pyd—Phe.(F)—$C_2F_5$ | II-47 |
| $R^2$—Dio—Phe.(F)—$R^2$ | II-48 |
| $R^2$—Dio—Phe.(F)—F | II-49 |
| $R^2$—Dio—Phe.(F)—Cl | II-50 |
| $R^2$—Dio—Phe.(F)—$OCF_3$ | II-51 |
| $R^2$—Dio—Phe.(F)—$C_2F_5$ | II-52 |

In the compounds of the formulae II 1–II 52, $R^2$ is n-alkyl, n-alkoxy or n-alkenyl having 1–9 carbon atoms, in particular 1–8 carbon atoms, in particular methyl, ethyl, propyl, butyl, pentyl, hexyl, heptyl, methoxy, ethoxy, propoxy, butoxy, pentoxy, hexoxy, heptoxy, prop-2-enyl, but-2-enyl, but-3-enyl, pent-2-enyl, pent-3-enyl, pent-4-enyl, hex-3-enyl, hex-4-enyl, hex-5-enyl or hex-6-enyl.

Particular preference is given to liquid-crystal mixtures according to the invention which contain at least 10%, in particular more than 15%, of compounds of the formulae II-1–II-52 and simultaneously more than 15%, in particular more than 20%, of compounds selected from the group of compounds which contain at least one structural element (G1)–(G4) and/or are characterized by the formula I. Very particular preference is furthermore given to liquid-crystal mixtures which are based on bicyclic compounds of the formulae II-1–II-52 and tricyclic compounds containing at least one structural element (G1)–(G4) and/or of the formula I. The component of liquid-crystal mixtures according to the invention which comprises compounds of the formulae II-1–II-52 preferably contains between 0 and 60% of dielectrically neutral compounds where the second terminal group denotes $R^2$ and between 40–100% of dielectrically positive compounds where the second terminal group denotes F, Cl, $CF_3$, $OCF_3$ or $OCF_2H$.

Liquid-crystal mixtures according to the invention which contain at least one compound of the formulae II-1 to II-52 frequently have particularly favorable viscosity values. Liquid-crystal mixtures which have a viscosity at 20° C. of not more than 25 $mm^2 s^{-1}$ in particular less than 20 $mm^2 s^{-1}$, very particularly less than 16 $mm^2 s^{-1}$, are particularly preferred.

The starting mixture furthermore preferably contains dielectrically neutral compounds containing 3 or 4 rings.

Particular preference is given to the following smaller group of compounds of the formulae III3-1–III3-12 and III4-1–III4-5:

| | |
|---|---|
| $R^3$—Cyc—Phe.(F)—$CH_2CH_2$—Phe—$R^4$ | III3-1 |
| $R^3$—Cyc—Phe—$CH_2CH_2$—Cyc—$R^4$ | III3-2 |
| $R^3$—Cyc—Cyc—$CH_2CH_2$—Phe—$R^4$ | III3-3 |
| $R^3$—Cyc—$CH_2CH_2$—Cyc—Phe—$R^4$ | III3-4 |
| $R^3$—Cyc—Cyc—Phe.(F)—$R^4$ | III3-5 |
| $R^3$—Cyc—Phe—Cyc—$R^4$ | III3-6 |
| $R^3$—Cyc—Cyc—COO—Cyc—$R^4$ | III3-7 |
| $R^3$—Cyc—COO—Cyc—Phe—$R^4$ | III3-8 |
| $R^3$—Cyc—Cyc—COO—Phe.(F)—$R^4$ | III3-9 |
| $R^3$—Cyc—Phe.(F)—Phe—$R^4$ | III3-10 |
| $R^3$—Phe—Phe—Phe—$R^4$ | III3-11 |
| $R^3$—Cyc—$CH_2CH_2$—Phe.(F)—Phe—$R^4$ | III3-12 |
| $R^3$—Cyc—Phe.(F)—Phe—Cyc—$R^4$ | III4-1 |
| $R^3$—Cyc—$CH_2CH_2$—Phe—Phe—Cyc—$R^4$ | III4-2 |
| $R^3$—Cyc—Cyc—Phe—Cyc—$R^4$ | III4-3 |
| $R^3$—Cyc—Cyc—$CH_2CH_2$—Phe.(F)—Cyc—$R^4$ | III4-4 |
| $R^3$—Cyc—Cyc—Cyc—Phe.(F)—$R^4$ | III4-5 |

In the compounds of the formulae III3-1–III3-12 and III4-1–III4-5, $R^3$ and $R^4$ are preferably, independently of one another, n-alkyl or n-alkoxy having 1–8 carbon atoms or (trans)-n-alkenyl having 3–7 carbon atoms. The proportion of compounds III3-1–III3-12 and III4-1–III4-5 in the liquid-crystal mixtures according to the invention is preferably between 1% and 20%, in particular between 2% and 15%. Particular preference is given to liquid-crystal mixtures according to the invention which contain one or more compounds containing at least one structural element (G1)–(G4) and/or of the formula I in a proportion by weight of 15%–75%, in particular 20%–70%, one or more compounds of the formula II in a proportion by weight of 2%–70%, in particular 5%–60%, and furthermore one or more compounds of the formula III in a proportion by weight of between 0% and 20%, in particular between 1% and 15%.

The liquid-crystal displays filled with liquid-crystal mixtures according to the invention are distinguished by a low threshold voltage, high stability and favorable response times.

The liquid-crystal mixtures according to the invention may, in addition to one or more compounds selected from a group of compounds containing at least one structural element (G1)–(G4) and/or of the formula I and if desired of the formulae II and III, also contain further compounds. Thus, the liquid-crystal compounds according to the invention may contain, for example, nitrile compounds of the formulae IV–VIII

| | |
|---|---|
| $\bar{R}$—P—Phe.(F)—CN | IV |
| $\bar{R}$—P—Cyc—CN | V |
| $\bar{R}$—P—Phe—V—Phe.(F)—CN | VI |
| W—Pyd—Phe.(F)—CN | VII |
| W—Pyr—Phe.(F)—CN | VIII | in which $\bar{R}$ are each, independently of one another, an alkyl group having 1–15 carbon atoms in which, in addition, one or two non-adjacent $CH_2$ groups may be replaced by —O—, —CO— and/or —CH=CH—, V is a single bond, —COO— or —OOC—, P is -Phe-V- or -Cyc-V-, and W is $\bar{R}$, $\bar{R}$-Phe.(F) or $\bar{R}$-Cyc.

However, it has been found that systems according to the invention whose liquid-crystal mixture contains more than 15% of nitrile compounds frequently have inadequate stability, which is undesired, in particular, when the liquid-crystal mixture is used in active matrix displays.

The proportion by weight of nitrile compounds in the liquid-crystal mixture is preferably small and is in particular not greater than 10%, very particularly not greater than 7.5%. Systems according to the invention whose liquid-crystal mixtures contain no nitrile compounds are particularly preferred for active matrix applications.

The liquid-crystal mixtures used according to the invention may contain further constituents, preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The liquid-crystal mixtures used in the electrooptical systems according to the invention preferably also contain one or more dielectrically neutral compounds of the formulae 1–5:

| | |
|---|---|
| R"—L—E—R'" | 1 |
| R"—L—COO—E—R'" | 2 |
| R"—L—OOC—E—R'" | 3 |
| R"—L—$CH_2CH_2$—E—R'" | 4 |
| R"—L—C≡C—E—R'" | 5 |

In the formulae 1, 2, 3, 4 and 5, L and E, which may be identical or different, are in each case, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The liquid crystals according to the invention preferably contain one or more components selected from the compounds of the formulae 1, 2, 3, 4 and 5 in which L and E are selected from the group comprising Cyc, Phe and Pyr and simultaneously one or more components selected from the compounds of the formulae 1, 2, 3, 4 and 5 in which one of the radicals L and E is selected from the group comprising Cyc, Phe and Pyr and the other radical is selected from the group comprising -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group comprising -Phe-Cyc-, -Cyc-Cyc-, -G-Phe- and -G-Cyc-.

In the compounds of the formulae 1, 2, 3 4 and 5, R" and R'" are in each case, independently of one another, preferably alkyl, alkenyl, alkoxy, alkenyloxy or alkanoyloxy having up to 8 carbon atoms. In most of these compounds, R" and R'" are different from one another, one of these radicals being, in particular, alkyl, alkoxy or alkenyl.

The proportion by weight of the compounds of the formulae 1–5 in the liquid crystals used according to the invention is preferably 0–50%, in particular 0–40%.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

The entire disclosure of all applications, patents and publications, cited above and below, and of corresponding German Application p 41 07 167.0, filed Mar. 6, 1991, are hereby incorporated by reference.

EXAMPLE

The examples below are intended to illustrate the invention, without representing a limitation.

Above and below, percentages are always percent by weight and temperatures are given in °C.

Example 1

A liquid-crystal mixture comprising
25.0% of $H_7C_3$-Cyc-Cyc-Phe.3F5F-F
15.0% of $H_{11}C_5$-Cyc-Cyc-Phe.3F5F-F
20.0% of $H_7C_3$-Cyc-Phe-Phe.3F5F-F
40.0% of $H_{11}C_3$-Cyc-Phe-Phe.3F5F-F
has the following parameters:
$\Delta\epsilon = 9.4$
$K_{11} = 5.3 \cdot 10^{-12} N$
$K_{22} = 3.6 \cdot 10^{-12} N$
$K_{33} = 8.4 \cdot 10^{-12} N$
$\overline{K}/\Delta\epsilon = 0.60$
A TN cell having $v=90°$ filled with this liquid-crystal mixture has a low threshold voltage and high contrast.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a liquid crystal display comprising:

two substrates provided with electrode layers and alignment layers thereon which, with a frame, form a cell;

a nematic liquid-crystal mixture having positive dielectric anisotropy which is present in said cell and which forms a liquid-crystal layer; and said liquid-crystal layer in said cell having a twist angle value of greater than 0° up to and including 600° from alignment layer to alignment layer;

the improvement comprising:
said liquid crystal mixture is based on superfluorinated compounds of Formula I

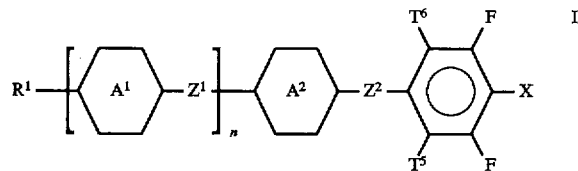

wherein $R^1$ is an alkyl, alkoxy, oxaalkyl or alkenyl radical having 1–10 carbon atoms which is unsubstituted or at least monosubstituted by halogen, n is 0 or 1, $Z^1$ and $Z^2$, independently of one another, are —$CH_2CH_2$—, —COO—, —OCO— or a single bond, $T^5$ and $T^6$, independently of one another, are H or F,

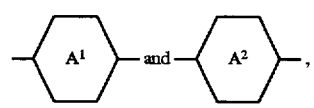

independently of one another, are each Cyc, Phe, 2-fluoro-1,4-phenylene or 3-fluoro-1,3-phenylene, and one of

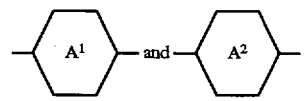

is alternatively Pyd, Pyr or Dio

Cyc is trans-1,4-cyclohexylene,
Phe is 1,4-phenylene,
Pyd is pyridine-2,5-diyl,
Pyr is pyrimidine-2,5-diyl,
Dio is trans-1,3-dioxane-2,5-diyl, and
X is F, Cl, $OCF_3$ or $CF_3$,
said liquid crystal mixture has a viscosity at 20° C. of less than 30 $mm^2$ $s^{-1}$ and has a value of $\overline{K}/\Delta\epsilon \leq 1.5$ for the quotient of the Frank constant, $\overline{K}$, $$\overline{K} = K_{11} + \left(\frac{v}{\pi}\right)^2 \left\{ K_{33} - K_{22}\left(1 - \frac{2\pi d}{p \cdot v}\right) \right\}$$

and the dielectric anisotropy, $\Delta\epsilon$, $$\Delta\epsilon = \epsilon_{\parallel} - \epsilon_{\perp}$$

when used in a twisted nematic cell, having $v$ equal to $\pi/2$ and $d/p<1$, wherein $v$ is the twist angle in rad, d is the layer thickness in μm, p is the pitch length in μm, and $K_{11}$, $K_{22}$ and $K_{33}$ are the elastic constants for splay, twist and bend, respectively, in $10^{-12}$N.

2. A liquid crystal display in accordance with claim 1, wherein said liquid crystal mixture contains one or more bicyclic compounds of Formulae I2-1 to I2-9

| | |
|---|---|
| $R^1$—Cyc—Phe.3F5F—X | I2-1, |
| $R^1$—Cyc—CH$_2$CH$_2$—Phe.3F5F—X | I2-2, |
| $R^1$—Phe—Phe.3F5F—X | I2-3, |
| $R^1$—Phe—3F—Phe.3F5F—X | I2-4, |
| $R^1$—Phe.(F)—COO—Phe.3F5F—X | I2-5, |
| $R^1$—Pyr—Phe.3F5F—X | I2-6, |
| $R^1$—Pyd—Phe.3F5F—X | I2-7, |
| $R^1$—Dio—Phe.3F5F—X | I2-8, |
| $R^1$—Phe.(F)—CH$_2$CH$_2$—Phe.3F5F—X | I2-9, | wherein

X is F, Cl, OCF$_3$, or CF$_3$; and $R^1$ is an alkyl, alkoxy, oxaalkyl, or alkenyl radical, each having 1–10 C atoms and which in each case is unsubstituted or substituted by halogen;

Phe.(F) is a 1,4-phenylene group which is unsubstituted or 2- or 3-monofluorinated; and Phe.3F5F is 3,5-difluorinated-1,4-phenylene.

3. A liquid crystal display according to claim 1, wherein said liquid crystal mixture contains one or more tricyclic compounds of Formulae I3-1 to I3-25

| | |
|---|---|
| $R^1$—Cyc—Cyc—Phe.3F5F—X | I3-1, |
| $R^1$—Cyc—Cyc—CH$_2$CH$_2$—Phe.3F5F—X | I3-2, |
| $R^1$—Cyc—Cyc—COO—Phe.3F5F—X | I3-3, |
| $R^1$—Cyc—Phe—Phe.3F5F—X | I3-4, |
| $R^1$—Cyc—CH$_2$CH$_2$—Phe.(F)—Phe.3F5F—X | I3-5, |
| $R^1$—Cyc—COO—Phe.(F)—Phe.3F5F—X | I3-6, |
| $R^1$—Cyc—Phe.3F—Phe.3F5F—X | I3-7, |
| $R^1$—Cyc—Phe.2F—Phe.3F5F—X | I3-8, |
| $R^1$—Cyc—Phe.3F5F—Phe.3F5F—X | I3-9, |
| $R^1$—Phe.(F)—Phe.(F)—Phe.3F5F—X | I3-10, |
| $R^1$—Phe—CH$_2$CH$_2$—Phe.(F)—Phe.3F5F—X | I3-11, |
| $R^1$—Phe—COO—Phe.(F)—Phe.3F5F—X | I3-12, |
| $R^1$—Phe—Phe.(F)—CH$_2$CH$_2$—Phe.3F5F—X | I3-13, |
| $R^1$—Cyc—Phe—CH$_2$CH$_2$—Phe.3F5F—X | I3-14, |
| $R^1$—Cyc—Phe.3F—CH$_2$CH$_2$—Phe.3F5F—X | I3-15, |
| $R^1$—Cyc—Phe.3F5F—CH$_2$CH$_2$—Phe.3F5F—X | I3-16, |
| $R^1$—Cyc—Phe—COO—Phe.3F5F—X | I3-17, |
| $R^1$—Cyc—Phe.3F—COO—Phe.3F5F—X | I3-18, |
| $R^1$—Cyc—Phe.2F—COO—Phe.3F5F—X | I3-19, |
| $R^1$—Cyc—Phe.3F5F—COO—Phe.3F5F—X | I3-20, |
| $R^1$—Pyd—Phe.(F)—Phe.3F5F—X | I3-21, |
| $R^1$—Pyr—Phe.(F)—Phe.3F5F—X | I3-22, |
| $R^1$—Dio—Cyc—Phe.3F5F—X | I3-23, |
| $R^1$—Dio—Cyc—CH$_2$CH$_2$—Phe.3F5F—X | I3-24, |
| $R^1$—Dio—Cyc—COO—Phe.3F5F—X | I3-25, | wherein

X is F, Cl, OCF$_3$, or CF$_3$;

$R^1$ is an alkyl, alkoxy, oxaalkyl, or alkenyl radical, each having 1–10 C atoms and which in each case is unsubstituted or substituted by halogen;

Phe.(F) is a 1,4-phenylene group which is unsubstituted or 2- or 3-monofluorinated; and Phe.3F5F is 3,5-difluorinated-1,4-phenylene.

4. A liquid crystal display according to claim 1, wherein said liquid crystal mixture has a value of $\overline{K}/\Delta\epsilon$ of less than 1.3.

5. A liquid crystal display according to claim 1, wherein said liquid crystal mixture has a value of $\overline{K}/\Delta\epsilon$ of less than 1.2.

6. A liquid crystal display according to claim 1, wherein said liquid crystal mixture has a value of $\overline{K}/\Delta\epsilon$ of less than 1.1.

7. A liquid crystal display according to claim 1, wherein said liquid crystal mixture has a value of $\overline{K}/\Delta\epsilon$ of less than 1.0.

8. A liquid crystal display according to claim 1, wherein said liquid crystal mixture contains one or more tetracyclic compounds of formulae I4-1 to I4-9

| | |
|---|---|
| $R^1$—Phe—Phe.(F)—Phe.(F)—Phe.3F5F—X | I4-1, |
| $R^1$—Cyc—Phe.(F)—Phe.(F)—Phe.3F5F—X | I4-2, |
| $R^1$—Dio—Phe.(F)—Phe.(F)—Phe.3F5F—X | I4-3, |
| $R^1$—Cyc—Cyc—Phe.(F)—Phe.3F5F—X | I4-4, |
| $R^1$—Cyc—Cyc—CH$_2$CH$_2$—Phe.(F)—Phe.3F5F—X | I4-5, |
| $R^1$—Cyc—Cyc—COO—Phe.(F)—Phe.3F5F—X | I4-6, |
| $R^1$—Cyc—Cyc—Cyc—Phe.3F5F—X | I4-7, |
| $R^1$—Cyc—Cyc—Cyc—CH$_2$CH$_2$—Phe.3F5F—X | I4-8, |
| $R^1$—Cyc—Cyc—Cyc—COO—Phe.3F5F—X | I4-9, | wherein

X is F, Cl, OCF$_3$ or CF$_3$;

$R^1$ is an alkyl, alkoxy, oxaalkyl or alkenyl radical, each having 1–10 C atoms and which in each case is unsubstituted or substituted by halogen;

Phe.(F) is a 1,4-phenylene group which is unsubstituted or 2- or 3-monofluorinated; and Phe.3F5F is 3,5-difluorinated-1,4-phenylene.

9. A liquid crystal display according to claim 1, wherein said liquid-crystal mixture further contains bicyclic compounds of formula II-1 to II-52

| | |
|---|---|
| $R^2$—Cyc—Phe—$R^2$ | II-1, |
| $R^2$—Cyc—Phe.(F)—F | II-2, |
| $R^2$—Cyc—Phe.(F)—Cl | II-3, |
| $R^2$—Cyc—Phe.(F)—CF$_3$ | II-4, |
| $R^2$—Cyc—Phe.(F)—OCF$_3$ | II-5, |
| $R^2$—Cyc—Phe.(F)—C$_2$F$_5$ | II-6, |
| $R^2$—Cyc—CH$_2$CH$_2$—Phe.(F)—$R^2$ | II-7, |
| $R^2$—Cyc—CH$_2$CH$_2$—Phe.(F)—Cl | II-8, |
| $R^2$—Cyc—CH$_2$CH$_2$—Phe.(F)—F | II-9, |
| $R^2$—Cyc—CH$_2$CH$_2$—Phe.(F)—CF$_3$ | II-10, |
| $R^2$—Cyc—CH$_2$CH$_2$—Phe.(F)—OCF$_3$ | II-11, |
| $R^2$—Cyc—COO—Phe.(F)—$R^2$ | II-12, |
| $R^2$—Cyc—COO—Phe.(F)—Cl | II-13, |
| $R^2$—Cyc—COO—Phe.(F)—F | II-14, |
| $R^2$—Cyc—COO—Phe.(F)—CF$_3$ | II-15, |
| $R^2$—Cyc—COO—Phe.(F)—OCF$_3$ | II-16, |
| $R^2$—Phe.(F)—Phe.(F)—$R^2$ | II-17, |
| $R^2$—Phe.(F)—Phe.(F)—F | II-18, |
| $R^2$—Phe.(F)—Phe.(F)—Cl | II-19, |
| $R^2$—Phe.(F)—Phe.(F)—CF$_3$ | II-20, |
| $R^2$—Phe.(F)—Phe.(F)—OCF$_3$ | II-21, |
| $R^2$—Phe.(F)—COO—Phe.(F)—$R^2$ | II-22, |

-continued

| | |
|---|---|
| R²—Phe.(F)—COO—Phe.(F)—F | II-23, |
| R²—Phe.(F)—COO—Phe.(F)—Cl | II-24, |
| R²—Phe.(F)—COO—Phe.(F)—CF₃ | II-25, |
| R²—Phe.(F)—COO—Phe.(F)—OCF₃ | II-26, |
| R²—Phe.(F)—CH₂CH₂—Phe.(F)—R² | II-27, |
| R²—Phe.(F)—CH₂CH₂—Phe.(F)—F | II-28, |
| R²—Phe.(F)—CH₂CH₂—Phe.(F)—Cl | II-29, |
| R²—Phe.(F)—CH₂CH₂—Phe.(F)—CF₃ | II-30, |
| R²—Phe.(F)—CH₂CH₂—Phe.(F)—OCF₃ | II-31, |
| R²—Phe.(F)—CH₂CH₂—Phe.(F)—OC₂F₅ | II-32, |
| R²—Dio—Cyc—R² | II-33, |
| R²—Cyc—CyC—R² | II-34, |
| R²—Pyr—Phe.(F)—R² | II-35, |
| R²—Pyr—Phe.(F)—F | II-36, |
| R²—Pyr—Phe.(F)—Cl | II-37, |
| R²—Pyr—Phe.(F)—CF₃ | II-38, |
| R²—Pyr—Phe.(F)—OCF₃ | II-39, |
| R²—Pyr—Phe.(F)—OCHF₂ | II-40, |
| R²—Pyr—Phe.(F)—C₂F₅ | II-41, |
| R²—Pyd—Phe.(F)—R² | II-42, |
| R²—Pyd—Phe.(F)—F | II-43, |
| R²—Pyd—Phe.(F)—Cl | II-44, |
| R²—Pyd—Phe.(F)—OCF₃ | II-45, |
| R²—Pyd—Phe.(F)—OCHF₂ | II-46, |
| R²—Pyd—Phe.(F)—C₂F₅ | II-47, |
| R²—Dio—Phe.(F)—R² | II-48, |
| R²—Dio—Phe.(F)—F | II-49, |
| R²—Dio—Phe.(F)—Cl | II-50, |
| R²—Dio—Phe.(F)—OCF₃ | II-51, |
| R²—Dio—Phe.(F)—C₂F₅ | II-52, | wherein $R^2$ is n-alkyl, or n-alkenyl, each having 1–9 C atoms; and Phe.(F) is a 1,4-phenylene group which is unsubstituted or 2- or 3-monofluorinated.

10. A liquid crystal display according to claim 1, wherein said liquid-crystal mixture further contains at least one compound of formulae III3-1 to III3-12 or formulae III4-1 to III4-5

| | |
|---|---|
| R³—Cyc—Phe.(F)—CH₂CH₂—Phe—R⁴ | III3-1, |
| R³—Cyc—Phe—CH₂CH₂—Cyc—R⁴ | III3-2, |
| R³—Cyc—Cyc—CH₂CH₂—Phe—R⁴ | III3-3, |
| R³—Cyc—CH₂CH₂—Cyc—Phe—R⁴ | III3-4, |
| R³—Cyc—Cyc—Phe.(F)—R⁴ | III3-5, |
| R³—Cyc—Phe—Cyc—R⁴ | III3-6, |
| R³—Cyc—Cyc—COO—Cyc—R⁴ | III3-7, |
| R³—Cyc—COO—Cyc—Phe—R⁴ | III3-8, |
| R³—Cyc—Cyc—COO—Phe.(F)—R⁴ | III3-9, |
| R³—Cyc—Phe.(F)—Phe—R⁴ | III3-10, |
| R³—Phe—Phe—Phe—R⁴ | III3-11, |
| R³—Cyc—CH₂CH₂—Phe.(F)—Phe—R⁴ | III3-12, |
| R³—Cyc—Phe.(F)—Phe—Cyc—R⁴ | III4-1, |
| R³—Cyc—CH₂CH₂—Phe—Phe—Cyc—R⁴ | III4-2, |
| R³—Cyc—Cyc—Phe—Cyc—R⁴ | III4-3, |
| R³—Cyc—Cyc—CH₂CH₂—Phe.(F)—Cyc—R⁴ | III4-4, |
| R³—Cyc—Cyc—Cyc—Phe.(F)—R⁴ | III4-5, | wherein $R^3$ and $R^4$ are, independently of one another, n-alkyl or n-alkoxy having 1–8 carbon atoms or (trans)-n-alkenyl having 3–7 carbon atoms; and Phe.F is a 1,4-phenylene group which is unsubstituted or 2- or 3-monofluorinated.

11. A display according to claim 1, wherein said liquid-crystal mixture contains not less than 10% of one or more compounds of formula I.

12. A display according to claim 1, wherein said liquid-crystal mixture contains not less than 15% of one or more compounds of formula I.

13. A display according to claim 1, wherein said liquid-crystal mixture contains more than 17.5% of one or more compounds of formula I.

14. A display according to claim 2, wherein said liquid-crystal mixture contains at least 15% of one or more compounds of formulae I2-1 to I2-9.

15. A display according to claim 3, wherein said liquid-crystal mixture contains at least 15% of one or more compounds of formulae I3-1 to I3-25.

16. A display according to claim 8, wherein said liquid-crystal mixture contains less than 20% of one or more compounds of formulae I4-1 to I4-9.

17. A display according to claim 9, wherein said liquid-crystal mixture contains at least 10% of one or more compounds of formulae II-1 to II-52 and more than 15% of one or more compounds of formula I.

18. A display according to claim 10, wherein said liquid-crystal mixture contains 1-20% of one or more compounds of formulae III3-1 to III3-12 and III4-1 to III4-5.

19. A liquid crystal display according to claim 10, wherein said liquid-crystal mixture further contains at least one compound of formulae III3-1 to III3-12 and at least one compound of formulae III4-1 to III4-5.

20. A liquid crystal display according to claim 1, wherein said liquid-crystal mixture contains less than 65% of compounds exhibiting a structural element of formula G2

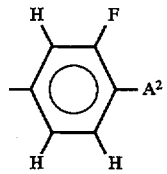

(G2)

wherein $A^2$ is Cl, F, CF₃ or OCF₃.

21. A liquid crystal display according to claim 2, wherein said liquid-crystal mixture contains at least 20% of compounds according to formulae I2-1 to I2-9 wherein X is F.

22. A liquid crystal display according to claim 3, wherein said liquid-crystal mixture contains greater than 20% of compounds of formulae I3-1 to I3-25.

23. A liquid crystal display according to claim 1, wherein said liquid-crystal mixture contains greater than 20% of compounds of formulae I.

24. A liquid crystal display according to claim 9, wherein said liquid-crystal mixture contains at least 10% of compounds of formulae II-1 to II-52.

25. A liquid crystal display according to claim 1, wherein said liquid-crystal mixture has a viscosity of less than 20 mm² s⁻¹ at 20° C.

26. A liquid crystal display according to claim 1, wherein said liquid-crystal mixture has a viscosity of less than 16 mm² s⁻¹ at 20° C.

27. In a liquid-crystal display based on a twisted nematic cell, said display comprising:

two substrates provided with electrode layers and alignment layers thereon which, with a frame, form a cell;

a nematic liquid-crystal mixture having positive dielectric anisotropy which is present in said cell and which forms a liquid-crystal layer; and said liquid-crystal layer in said cell having a twist angle ν, wherein $0<ν≦600°$, from alignment layer to alignment layer;

the improvement comprising:

said nematic liquid-crystal mixture being based on superfluorinated liquid-crystal materials, said nematic liquid-crystal mixture comprising:

(a) less than 5% of one or more superfluorinated liquid-crystal compounds of group (A), said liquid crystal compounds of group (A) have 2 to 4 ring groups attached in series by bridge groups, single bonds or combinations thereof wherein the terminal ring groups exhibit wing groups and possess a terminal structure of formula (G1)

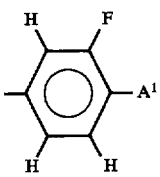
(G1)

wherein $A^1$ is —$OCHF_2$ or —$CHF_2$;

(b) less than 50% of one or more superfluorinated liquid-crystal compounds of group (B), said liquid crystal compounds of group (B) have 2 to 4 ring groups attached in series by bridge groups, single bonds or combinations thereof wherein the terminal ring groups exhibit wing groups and possess a terminal structure of formula (G2)

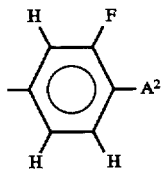
(G2)

wherein $A^2$ is Cl, F, $CF_3$ or $OCF_3$;

(c) 5% or more of one or more superfluorinated liquid-crystal compounds of group (C), said liquid crystal compounds of group (C) have 2 to 4 ring groups attached in series by bridge groups, single bonds or combinations thereof wherein the terminal ring groups exhibit wing groups and possess a terminal structure of formula (G3)

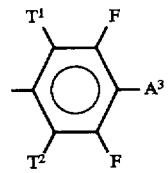
(G3)

wherein
$T^1$ and $T^2$, independently of one another, are H or F, and $A^3$ is F, Cl, $CF_3$, $C_2F_5$ or $OC_2F_5$; and (d) less than 30% of one or more superfluorinated liquid-crystal compounds of group (D), said liquid crystal compounds of group (D) have 2 to 4 ring groups attached in series by bridge groups, single bonds of combinations thereof wherein the terminal ring groups exhibit wing groups and possess a terminal structure of the formula

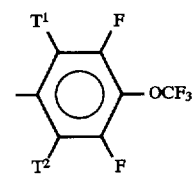

wherein $T^1$ and $T^2$ are independently from each other, H or F;

said nematic liquid-crystal mixture having a viscosity at 20° C. of less than 30 mm$^2$ s$^{-1}$; and said nematic liquid-crystal mixture having a value of $$\overline{K}/\Delta\epsilon \leq 1.5$$

for the quotient of the Frank constant, $\overline{K}$,

and the dielectric anisotropy, $\Delta\epsilon$, $$\Delta\epsilon = \epsilon_\| - \epsilon_\perp$$

when used in a twisted nematic cell, having $\nu$ equal to $\pi/2$, and d/p<1,
wherein
$\nu$ is the twist angle in rad,
d is the layer thickness in μm,
p is the pitch length in μm, and
$K_{11}$, $K_{22}$ and $K_{33}$ are the elastic constants for splay, twist and bend, respectively, in $10^{-12}$N.

28. A liquid crystal display according to claim 27, wherein said liquid crystal mixture contains at least one of said superfluorinated liquid-crystal compounds of group (A) having a terminal structure of Formula (G1)

(G1)

wherein $A^1$ is —$OCHF_2$ or —$CHF_2$.

29. A liquid crystal display according to claim 27, wherein said liquid crystal mixture contains at least one of said superfluorinated liquid-crystal compounds of group (B) having a terminal structure of Formula (G2)

(G2)

wherein $A^2$ is Cl, F, $CF_3$, or $OCF_3$.

30. A liquid crystal display according to claim 27, wherein said liquid crystal mixture contains at least one of said superfluorinated liquid-crystal compounds of group (C) having a terminal structure of the Formula

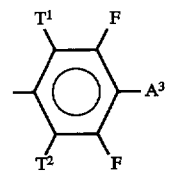

wherein
$T^1$ and $T^2$ are each, independently, H or F, and $A^3$ is F or Cl.

31. A liquid crystal display according to claim 30, wherein $T^1$ is F, and $T^2$ is H.

32. A liquid crystal display according to claim 30, wherein $T^1$ and $T^2$ are each F.

33. A liquid crystal display according to claim 27, wherein said liquid crystal mixture contains at least one of said superfluorinated liquid-crystal compounds of group (C) having a terminal structure of the formula

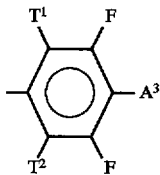

wherein $T^1$ and $T^2$ are each, independently, H or F, and $A^3$ is F.

34. A liquid crystal display according to claim 27, wherein said liquid crystal mixture contains at least one of said superfluorinated liquid-crystal compounds of group (E), said liquid crystal compounds of group (E) have 2 to 4 ring groups attached in series by bridge groups, single bonds or combinations thereof wherein the terminal ring groups exhibit wing groups and possesses a non-terminal structure of formula G4

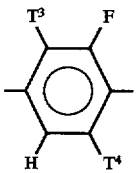  (G4)

wherein at least one of $T^3$ and $T^4$ is F, and the other is H or F.

35. A liquid crystal display according to claim 27, wherein said liquid crystal mixture contains 5–50% of one or more of said compounds of group (B) containing a terminal structure of formula (G2)

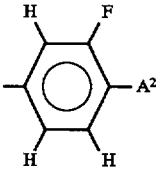  (G2)

wherein $A^2$ is Cl, F, $CF_3$, or $OCF_3$, and up to 65% of one or more of said compounds of group (C) containing a terminal structure of formula (G3)

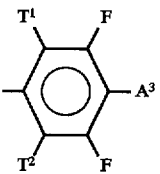  (G3)

wherein $T^1$ and $T^2$ are each, independently, H or F, and $A^3$ is F, Cl, $CF_3$, $C_2F_5$ or $OC_2F_5$.

36. A liquid crystal display according to claim 27, wherein said liquid crystal mixture has a value of $\overline{K}/\Delta\epsilon$ of less than 1.2.

37. A liquid crystal display according to claim 27, wherein said liquid crystal mixture has a value of $\overline{K}/\Delta\epsilon$ of less than 1.0.

38. A liquid crystal display according to claim 32, wherein said liquid crystal mixture contains at least one tetracyclic compounds of Formulae I4-1 to I4-9

| | |
|---|---|
| $R^1$—Phe—Phe.(F)—Phe.(F)—Phe.3F5F—X | I4-1, |
| $R^1$—Cyc—Phe.(F)—Phe.(F)—Phe.3F5F—X | I4-2, |
| $R^1$—Dio—Phe.(F)—Phe.(F)—Phe.3F5F—X | I4-3, |
| $R^1$—Cyc—Cyc—Phe.(F)—Phe.3F5F—X | I4-4, |
| $R^1$—Cyc—Cyc—CH$_2$CH$_2$—Phe.(F)—Phe.3F5F—X | I4-5, |
| $R^1$—Cyc—Cyc—COO—Phe.(F)—Phe.3F5F—X | I4-6, |
| $R^1$—Cyc—Cyc—Phe.3F5F—X | I4-7, |
| $R^1$—Cyc—Cyc—Cyc—CH$_2$CH$_2$—Phe.3F5F—X | I4-8, |
| $R^1$—Cyc—Cyc—Cyc—COO—Phe.3F5F—X | I4-9, | wherein

X is F, Cl, $OCF_3$, or $CF_3$, $R^1$ is an alkyl, alkoxy, oxaalkyl, or alkenyl radical, each having 1–10 C atoms and which in each case is unsubstituted or substituted by halogen, Cyc is trans-1,4-cyclohexylene, Phe is 1,4-phenylene, Phe(F) is 1,4-phenylene which is unsubstituted or 2- or 3-monofluorinated, and Phe.3F5F is 3,5-difluorinated-1,4-phenylene.

39. A liquid crystal display according to claim 27, wherein said liquid crystal mixture contains at least one bicyclic compound of Formulae II-1 to 11-52

| | |
|---|---|
| $R^2$—Cyc—Phe—$R^2$ | II-1, |
| $R^2$—Cyc—Phe.(F)—F | II-2, |
| $R^2$—Cyc—Phe.(F)—Cl | II-3, |
| $R^2$—Cyc—Phe.(F)—$CF_3$ | II-4, |
| $R^2$—Cyc—Phe.(F)—$OCF_3$ | II-5, |
| $R^2$—Cyc—Phe.(F)—$C_2F_5$ | II-6, |
| $R^2$—Cyc—CH$_2$CH$_2$—Phe.(F)—$R^2$ | II-7, |
| $R^2$—Cyc—CH$_2$CH$_2$—Phe.(F)—Cl | II-8, |
| $R^2$—Cyc—CH$_2$CH$_2$—Phe.(F)—F | II-9, |
| $R^2$—Cyc—CH$_2$CH$_2$—Phe.(F)—$CF_3$ | II-10, |
| $R^2$—Cyc—CH$_2$CH$_2$—Phe.(F)—$OCF_3$ | II-11, |
| $R^2$—Cyc—COO—Phe.(F)—$R^2$ | II-12, |
| $R^2$—Cyc—COO—Phe.(F)—Cl | II-13, |
| $R^2$—Cyc—COO—Phe.(F)—F | II-14, |
| $R^2$—Cyc—COO—Phe.(F)—$CF_3$ | II-15, |
| $R^2$—Cyc—COO—Phe.(F)—$OCF_3$ | II-16, |
| $R^2$—Phe.(F)—Phe.(F)—$R^2$ | II-17, |
| $R^2$—Phe.(F)—Phe.(F)—F | II-18, |
| $R^2$—Phe.(F)—Phe.(F)—Cl | II-19, |
| $R^2$—Phe.(F)—Phe.(F)—$CF_3$ | II-20, |
| $R^2$—Phe.(F)—Phe.(F)—$OCF_3$ | II-21, |
| $R^2$—Phe.(F)—COO—Phe.(F)—$R^2$ | II-22, |
| $R^2$—Phe.(F)—COO—Phe.(F)—F | II-23, |
| $R^2$—Phe.(F)—COO—Phe.(F)—Cl | II-24, |
| $R^2$—Phe.(F)—COO—Phe.(F)—$CF_3$ | II-25, |
| $R^2$—Phe.(F)—COO—Phe.(F)—$OCF_3$ | II-26, |
| $R^2$—Phe.(F)—CH$_2$CH$_2$—Phe.(F)—$R^2$ | II-27, |
| $R^2$—Phe.(F)—CH$_2$CH$_2$—Phe.(F)—F | II-28, |
| $R^2$—Phe.(F)—CH$_2$CH$_2$—Phe.(F)—Cl | II-29, |
| $R^2$—Phe.(F)—CH$_2$CH$_2$—Phe.(F)—$CF_3$ | II-30, |
| $R^2$—Phe.(F)—CH$_2$CH$_2$—Phe.(F)—$OCF_3$ | II-31, |
| $R^2$—Phe.(F)—CH$_2$CH$_2$—Phe.(F)—$OC_2F_5$ | II-32, |
| $R^2$—Dio—Cyc—$R^2$ | II-33, |
| $R^2$—Cyc—Cyc—$R^2$ | II-34, |
| $R^2$—Pyr—Phe.(F)—$R^2$ | II-35, |
| $R^2$—Pyr—Phe.(F)—F | II-36, |
| $R^2$—Pyr—Phe.(F)—Cl | II-37, |
| $R^2$—Pyr—Phe.(F)—$CF_3$ | II-38, |
| $R^2$—Pyr—Phe.(F)—$OCF_3$ | II-39, |
| $R^2$—Pyr—Phe.(F)—$OCHF_2$ | II-40, |
| $R^2$—Pyr—Phe.(F)—$C_2F_5$ | II-41, |
| $R^2$—Pyd—Phe.(F)—$R^2$ | II-42, |
| $R^2$—Pyd—Phe.(F)—F | II-43, |
| $R^2$—Pyd—Phe.(F)—Cl | II-44, |
| $R^2$—Pyd—Phe.(F)—$OCF_3$ | II-45, |
| $R^2$—Pyd—Phe.(F)—$OCHF_2$ | II-46, |
| $R^2$—Pyd—Phe.(F)—$C_2F_5$ | II-47, |
| $R^2$—Dio—Phe.(F)—$R^2$ | II-48, |
| $R^2$—Dio—Phe.(F)—F | II-49, |

-continued

| | |
|---|---|
| R²—Dio—Phe.(F)—Cl | II-50, |
| R²—Dio—Phe.(F)—OCF₃ | II-51, |
| R²—Dio—Phe.(F)—C₂F₅ | II-52, | wherein R² is n-alkyl, n-alkoxy, or n-alkenyl, each having 1–9 C atoms,

Cyc is trans-1,4-cyclohexylene,

Phe is 1,4-phenylene,

Phe(F) is 1,4-phenylene which is unsubstituted or 2- or 3-monofluorinated,

Pyd is pyridine-2,5-dyl,

Pyr is pyrimidine-2,5-diyl, and

Dio is trans-1,3-dioxane-2,5-diyl.

40. A liquid crystal display according to claim 27, wherein said liquid crystal mixture contains at least one compound of Formulae III3-1 to III3-12, at least one compound of Formulae III4-1 to III4-5, or combinations thereof:

| | |
|---|---|
| R³—Cyc—Phe.(F)—CH₂CH₂—Phe—R⁴ | III3-1, |
| R³—Cyc—Phe—CH₂CH₂—Cyc—R⁴ | III3-2, |
| R³—Cyc—Cyc—CH₂CH₂—Phe—R⁴ | III3-3, |
| R³—Cyc—CH₂CH₂—Cyc—Phe—R⁴ | III3-4, |
| R³—Cyc—Cyc—Phe.(F)—R⁴ | III3-5, |
| R³—Cyc—Phe—Cyc—R⁴ | III3-6, |
| R³—Cyc—Cyc—COO—Cyc—R⁴ | III3-7, |
| R³—Cyc—COO—Cyc—Phe—R⁴ | III3-8, |
| R³—Cyc—Cyc—COO—Phe.(F)—R⁴ | III3-9, |
| R³—Cyc—Phe.(F)—Phe—R⁴ | III3-10, |
| R³—Phe—Phe—Phe—R⁴ | III3-11, |
| R³—Cyc—CH₂CH²—Phe.(F)—Phe—R⁴ | III3-12, |
| R³—Cyc—Phe.(F)—Phe—Cyc—R⁴ | III4-1, |
| R³—Cyc—CH₂CH₂—Phe—Cyc—R⁴ | III4-2, |
| R³—Cyc—Cyc—Phe—Cyc—R⁴ | III4-3, |
| R³—Cyc—Cyc—CH₂CH₂—Phe.(F)—Cyc—R⁴ | III4-4, |
| R³—Cyc—Cyc—Cyc—Phe.(F)—R⁴ | III4-5, | wherein

R³ and R⁴ are, independently of one another, n-alkyl or n-alkoxy having 1–8 carbon atoms or (trans)-n-alkenyl having 3–7 carbon atoms, Cyc is trans-1,4-cyclohexylene, Phe is 1,4-phenylene, and Phe(F) is 1,4-phenylene which is unsubstituted or 2- or 3-monofluorinated.

41. A liquid-crystal display according to claim 27, wherein one of said electrode layers is in the form of an active matrix having nonlinear addressing elements integrated into the pixel and the other electrode layer forms a counterelectrode.

42. In a method of generating an electrooptical display using a liquid-crystal display element, the improvement wherein said liquid-crystal display element is a display according to claim 27.

43. A liquid-crystal display according to claim 27, wherein said liquid-crystalline mixture contains at least 5% of one or more liquid crystal compounds having 2 to 4 ring groups attached in series by bridge groups, single bonds or combinations thereof wherein the terminal ring groups exhibit wing groups, and possess a terminal structure of formula G3-3 or formula G3-4

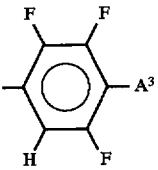

(G3-3)

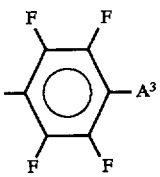

(G3-4)

wherein A³ is F, Cl, CF₃, OCF₃, C₂F₅ or OC₂F₅.

44. A liquid-crystal display according to claim 43, wherein said liquid crystal mixture has a value of $\overline{K}/\Delta\epsilon$ of less than 1.2.

45. A liquid-crystal display according to claim 43, wherein said liquid crystal mixture has a value of $\overline{K}/\Delta\epsilon$ of less than 1.0.

46. A liquid-crystal display according to claim 27, wherein said liquid-crystalline mixture contains 25% or more of one or more superfluorinated liquid-crystal compounds of group (C) with a terminal structure of formula (G3)

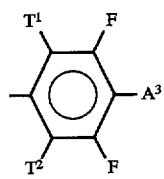

(G3)

wherein

T¹ and T², independently of one another, are H or F, and A³ is F, Cl, CF₃, C₂F₅ or OC₂F₅.

47. A liquid-crystal display according to claim 27, wherein said liquid-crystalline mixture contains less than 25% of one or more superfluorinated liquid-crystal compounds of group (D) with a terminal structure of the formula

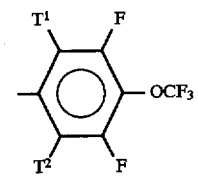

wherein T¹ and T² are, independently from each other, H or F.

48. In a liquid-crystal display based on a twisted nematic cell, said display comprising:

two substrates provided with electrode layers and alignment layers thereon which, with a frame, form a cell;

a nematic liquid-crystal mixture having positive dielectric anisotropy which is present in said cell and which forms a liquid-crystal layer; and said liquid-crystal layer in said cell having a twist angle v, wherein 0<v≦600°, from alignment layer to alignment layer;

the improvement comprising:

said nematic liquid-crystal mixture being based on superfluorinated liquid-crystal materials, said nematic liquid-crystal mixture comprising:

(a) less than 5% of one or more superfluorinated liquid-crystal compounds with a terminal group of formula (G1)

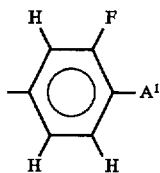
(G1)

wherein $A^1$ is —$OCHF_2$ or —$CHF_2$;

(b) less than 50% of one or more superfluorinated liquid-crystal compounds with a terminal group of formula (G2)

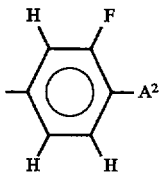
(G2)

wherein $A^2$ is Cl, F, $CF_3$ or $OCF_3$;

(c) 5% or more of one or more superfluorinated liquid-crystal compounds with a terminal group of formula (G3)

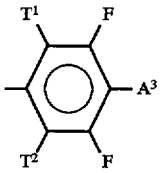
(G3)

wherein
$T^1$ and $T^2$, independently of one another, are H or F, and $A^3$ is F, Cl, $CF_3$, $C_2F_5$ or $OC_2F_5$; and (d) less than 30% of one or more superfluorinated liquid-crystal compounds with a terminal group of the formula

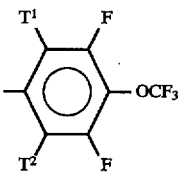

wherein $T^1$ and $T^2$ are independently from each other, H or F;

said nematic liquid-crystal mixture having a viscosity at 20° C. of less than 30 $mm^2$ $s^{-1}$; and said nematic liquid-crystal mixture having a value of $\overline{K}/\Delta\epsilon \leq 1.5$ for the quotient of the Frank constant, $\overline{K}$, $$\overline{K} = K_{11} + \left(\frac{\Theta}{\pi}\right)^2 \left\{ K_{33} - 2K_{22}\left(1 - \frac{2\pi d}{p \cdot \Theta}\right) \right\}$$

and the dielectric anisotropy, $\Delta\epsilon$, $\Delta\epsilon = \epsilon_\parallel - \epsilon_\perp$ when used in a twisted nematic cell, having $v$ equal to $\pi/2$, and d/p<1,
wherein
$v$ is the twist angle in rad,
d is the layer thickness in μm,
p is the pitch length in μm, and
$K_{11}$, $K_{22}$ and $K_{33}$ are the elastic constants for splay, twist and bend, respectively, in $10^{-12}$N.

49. A nematic liquid-crystal mixture based on superfluorinated liquid-crystal materials, said mixture comprising (a) less than 5% of one or more superfluorinated liquid-crystal compounds with a terminal group of formula (G1)

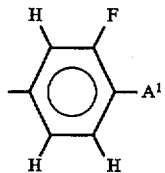
(G1)

wherein $A^1$ is —$OCHF_2$ or —$CHF_2$;

(b) less than 50% of one or more superfluorinated liquid-crystal compounds with a terminal group of formula (G2)

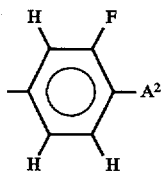
(G2)

wherein $A^2$ is Cl, F, $CF_3$ or $OCF_3$; and (c) 5% or more of one or more superfluorinated liquid-crystal compounds with a terminal group of formula (G3)

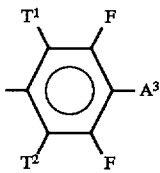
(G3)

wherein
$T^1$ and $T^2$, independently of one another, are H or F, and $A^3$ is F, Cl, $CF_3$, $C_2F_5$ or $OC_2F_5$;

said nematic liquid-crystal mixture having a viscosity at 20° C. of less than 30 $mm^2$ $s^{-1}$; and said nematic liquid-crystal mixture having a value of $\overline{K}/\Delta\epsilon \leq 1.5$ for the quotient of the Frank constant, $\overline{K}$, $$\overline{K} = K_{11} + \left(\frac{\Theta}{\pi}\right)^2 \left\{ K_{33} - 2K_{22}\left(1 - \frac{2\pi d}{p \cdot \Theta}\right) \right\}$$

and the dielectric anisotropy, $\Delta\epsilon$, $\Delta\epsilon = \epsilon_\parallel - \epsilon_\perp$ when used in a twisted nematic cell, having $v$ equal to $\pi/2$ and d/p<1, wherein
v is the twist angle in rad,
d is the layer thickness in µm,
p is the pitch length in µm, and
$K_{11}$, $K_{22}$ and $K_{33}$ are the elastic constants for splay, twist and bend, respectively, in $10^{-12}$N.

50. A nematic liquid-crystal mixture based on superfluorinated liquid-crystal materials, said mixture comprising:
(a) less than 5% of one or more superfluorinated liquid-crystal compounds of group (A),
   said liquid crystal compounds of group (A) have 2 to 4 ring groups attached in series by bridge groups, single bonds or combinations thereof wherein the terminal ring groups exhibit wing groups and possess a terminal structure of formula (G1)

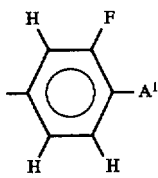

(G1)

wherein $A^1$ is —OCHF$_2$ or —CHF$_2$;

(b) less than 50% of one or more superfluorinated liquid-crystal compounds of group (B),
   said liquid crystal compounds of group (B) have 2 to 4 ring groups attached in series by bridge groups, single bonds or combinations thereof wherein the terminal ring groups exhibit wing groups and possess a terminal structure of formula (G2)

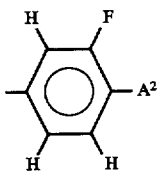

(G2)

wherein $A^2$ is Cl, F, CF$_3$ or OCF$_3$; and (c) 5% or more of one or more superfluorinated liquid-crystal compounds of group (C),
   said liquid crystal compounds of group (C) have 2 to 4 ring groups attached in series by bridge groups, single bonds or combinations thereof wherein the terminal ring groups exhibit wing groups and possess a terminal structure of formula (G3)

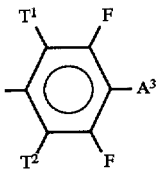

(G3)

wherein
$T^1$ and $T^2$, independently of one another, are H or F, and $A^3$ is F, Cl, CF$_3$, C$_2$F$_5$ or OC$_2$F$_5$;

said nematic liquid-crystal mixture having a viscosity at 20° C. of less than 30 mm$^2$ s$^{-1}$; and said nematic liquid-crystal mixture having a value of $$\overline{K}/\Delta\epsilon \leq 1.5$$

for the quotient of the Frank constant, $\overline{K}$, $$\overline{K} = K_{11} + \left(\frac{\Theta}{\pi}\right)^2 \left\{ K_{33} - 2K_{22}\left(1 - \frac{2\pi d}{p \cdot \Theta}\right) \right\}$$

and the dielectric anisotropy, $\Delta\epsilon$, $$\Delta\epsilon = \epsilon_\parallel - \epsilon_\perp$$

when used in a twisted nematic cell, having v equal to $\pi/2$ and d/p<1,
wherein
v is the twist angle in rad,
d is the layer thickness in µm,
p is the pitch length in µm, and
$K_{11}$, $K_{22}$ and $K_{33}$ are the elastic constants for splay, twist and bend, respectively, in $10^{-12}$N.

* * * * *